United States Patent
Minear et al.

(10) Patent No.: US 9,134,989 B2
(45) Date of Patent: Sep. 15, 2015

(54) SYSTEM AND METHOD FOR UPDATING DATASET VERSIONS RESIDENT ON A WIRELESS DEVICE

(75) Inventors: Brian Minear, San Diego, CA (US); Eric J. Lekven, Carlsbad, CA (US); Mitchell B. Oliver, San Diego, CA (US); Phil Nguyen, San Diego, CA (US); Richard Wayne Gardner, III, Solana Beach, CA (US); Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 10/061,875

(22) Filed: Jan. 31, 2002

(65) Prior Publication Data
US 2003/0143991 A1    Jul. 31, 2003

(51) Int. Cl.
| | |
|---|---|
| H04M 3/00 | (2006.01) |
| G06F 9/445 | (2006.01) |
| H04L 29/06 | (2006.01) |
| H04L 29/08 | (2006.01) |
| H04W 8/24 | (2009.01) |

(52) U.S. Cl.
CPC *G06F 8/65* (2013.01); *H04L 29/06* (2013.01); *H04L 67/04* (2013.01); *H04L 67/34* (2013.01); *H04L 69/329* (2013.01); *H04W 8/245* (2013.01)

(58) Field of Classification Search
CPC .............................. H04W 48/18; H04W 8/245
USPC ............. 455/418, 419, 420; 707/10, 200, 203
See application file for complete search history.

(56) References Cited

U.S. PATENT DOCUMENTS 5,155,847 A * 10/1992 Kirouac et al. ................ 709/221
5,473,772 A    12/1995 Halliwell et al.
(Continued)

FOREIGN PATENT DOCUMENTS

CN    1288199      3/2001
CN    1937533 A    3/2007
(Continued)

OTHER PUBLICATIONS

Advisory Action mailed Dec. 4, 2006, for U.S. Appl. No. 10/975,973, filed Oct. 27, 2004.
(Continued)

*Primary Examiner* — Kamran Afshar
*Assistant Examiner* — Michael Irace
(74) *Attorney, Agent, or Firm* — Fariba Yadegar-Bandari

(57) ABSTRACT

A system and method for selectively updating the versions of stored datasets on a wireless device that selectively communicates to a wireless network and downloads datasets, such as software applications and information, from download servers on the wireless network. The wireless device has a resident dataset version summary file that identifies the version of each resident dataset, and upon the wireless device attempting to communicate with the download server, the wireless device compares the version of each specific resident dataset listed in the resident dataset version summary file with the version of downloadable datasets resident on the download server to thereby determine if the version of a wireless device resident dataset is different from the version of a download server resident dataset. If the download server resident dataset is more recent, the wireless device can download it to overwrite the wireless device resident dataset.

37 Claims, 4 Drawing Sheets

(56) References Cited

U.S. PATENT DOCUMENTS

| | | | |
|---|---|---|---|
| 5,564,051 A | 10/1996 | Halliwell et al. | |
| 5,612,682 A | 3/1997 | DeLuca et al. | |
| 5,761,618 A | 6/1998 | Lynch et al. | |
| 5,848,064 A * | 12/1998 | Cowan | 370/338 |
| 5,913,213 A | 6/1999 | Wikstrom et al. | |
| 5,920,821 A | 7/1999 | Seazholtz et al. | |
| 5,995,756 A | 11/1999 | Herrmann | |
| 6,006,034 A | 12/1999 | Heath et al. | |
| 6,009,274 A | 12/1999 | Fletcher et al. | |
| 6,023,620 A * | 2/2000 | Hansson | 455/419 |
| 6,031,830 A * | 2/2000 | Cowan | 370/338 |
| 6,061,683 A | 5/2000 | Alonso | |
| 6,074,434 A | 6/2000 | Cole et al. | |
| 6,128,489 A * | 10/2000 | Seazholtz et al. | 455/432.1 |
| 6,167,567 A | 12/2000 | Chiles et al. | |
| 6,199,204 B1 | 3/2001 | Donohue | |
| 6,272,333 B1 * | 8/2001 | Smith | 455/418 |
| 6,272,677 B1 | 8/2001 | Lam et al. | |
| 6,308,061 B1 * | 10/2001 | Criss et al. | 455/419 |
| 6,314,565 B1 | 11/2001 | Kenner et al. | |
| 6,327,617 B1 | 12/2001 | Fawcett | |
| 6,360,366 B1 | 3/2002 | Heath et al. | |
| 6,389,423 B1 | 5/2002 | Sakakura | |
| 6,397,060 B1 | 5/2002 | Oikawa | |
| 6,418,554 B1 | 7/2002 | Delo et al. | |
| 6,493,871 B1 | 12/2002 | McGuire et al. | |
| 6,564,048 B1 * | 5/2003 | Sugita | 455/414.3 |
| 6,590,881 B1 | 7/2003 | Wallace et al. | |
| 6,636,872 B1 * | 10/2003 | Heath et al. | 707/201 |
| 6,643,506 B1 | 11/2003 | Criss et al. | |
| 6,687,901 B1 * | 2/2004 | Imamatsu | 717/173 |
| 6,735,625 B1 | 5/2004 | Ponna | |
| 6,735,766 B1 | 5/2004 | Chamberlain et al. | |
| 6,748,209 B2 * | 6/2004 | Lipsit | 455/411 |
| 6,754,894 B1 | 6/2004 | Costello et al. | |
| 6,789,255 B1 * | 9/2004 | Pedrizetti et al. | 717/170 |
| 6,807,415 B2 | 10/2004 | Sato | |
| 6,832,373 B2 | 12/2004 | O'Neill | |
| 6,868,455 B1 | 3/2005 | Ariyama | |
| 6,877,037 B1 | 4/2005 | Adachi | |
| 6,909,898 B2 | 6/2005 | Mielke et al. | |
| 6,961,764 B2 | 11/2005 | Mizoguchi | |
| 6,966,060 B1 | 11/2005 | Young et al. | |
| 6,970,960 B1 * | 11/2005 | Sarfati | 710/106 |
| 7,080,371 B1 | 7/2006 | Arnaiz et al. | |
| 7,127,712 B1 | 10/2006 | Noble et al. | |
| 7,140,013 B2 | 11/2006 | Te'eni et al. | |
| 7,149,508 B2 | 12/2006 | Herle | |
| 7,149,792 B1 | 12/2006 | Hansen et al. | |
| 7,194,258 B2 | 3/2007 | Okita et al. | |
| 7,243,163 B1 | 7/2007 | Friend et al. | |
| 7,287,097 B1 | 10/2007 | Friend et al. | |
| 7,391,759 B2 | 6/2008 | Wallace et al. | |
| 7,415,706 B1 | 8/2008 | Raju et al. | |
| 7,512,638 B2 | 3/2009 | Jhaveri et al. | |
| 7,516,451 B2 | 4/2009 | Peng | |
| 7,529,780 B1 | 5/2009 | Braginsky et al. | |
| 7,530,065 B1 | 5/2009 | Ciudad et al. | |
| 7,555,750 B1 | 6/2009 | Lilley | |
| 7,596,720 B2 | 9/2009 | Curtis et al. | |
| 7,603,447 B2 | 10/2009 | Hodgson | |
| 7,657,886 B1 | 2/2010 | Chen et al. | |
| 7,669,197 B1 | 2/2010 | O'Neill et al. | |
| 7,676,792 B2 | 3/2010 | Irie et al. | |
| 7,698,698 B2 | 4/2010 | Skan | |
| 7,747,567 B2 | 6/2010 | Teegan et al. | |
| 7,752,626 B1 | 7/2010 | Pandey et al. | |
| 7,788,662 B2 | 8/2010 | Haselden et al. | |
| 7,797,695 B2 | 9/2010 | Motta | |
| 7,840,957 B2 | 11/2010 | Kumashiro et al. | |
| 7,844,964 B2 | 11/2010 | Marolia | |
| 7,870,412 B2 | 1/2011 | Maes | |
| 7,958,502 B2 | 6/2011 | Motta et al. | |
| 7,971,199 B1 | 6/2011 | Chen | |
| 7,974,613 B1 | 7/2011 | Shanker et al. | |
| 7,987,449 B1 | 7/2011 | Marolia et al. | |
| 8,245,218 B2 | 8/2012 | Giambalvo et al. | |
| 8,311,981 B2 | 11/2012 | Braginsky et al. | |
| 8,316,224 B2 | 11/2012 | Vidal et al. | |
| 8,340,635 B2 | 12/2012 | Herz et al. | |
| 8,443,361 B2 | 5/2013 | Vidal et al. | |
| 8,495,621 B2 | 7/2013 | Traut et al. | |
| 8,522,232 B1 | 8/2013 | Carter et al. | |
| 8,555,273 B1 | 10/2013 | Chia et al. | |
| 8,595,715 B2 | 11/2013 | Ward et al. | |
| 8,612,398 B2 | 12/2013 | Jarrett et al. | |
| 8,612,516 B2 | 12/2013 | Mallur et al. | |
| 8,612,961 B2 | 12/2013 | Stewart | |
| 8,620,272 B2 | 12/2013 | Ganatra et al. | |
| 8,635,608 B2 | 1/2014 | Ramesh et al. | |
| 8,762,977 B2 | 6/2014 | Olsson et al. | |
| 8,893,109 B2 | 11/2014 | Birtwhistle et al. | |
| 8,918,775 B1 | 12/2014 | Carpenter et al. | |
| 2001/0029178 A1 * | 10/2001 | Criss et al. | 455/419 |
| 2001/0029605 A1 | 10/2001 | Forbes et al. | |
| 2001/0048728 A1 | 12/2001 | Peng | |
| 2001/0052052 A1 | 12/2001 | Peng | |
| 2001/0053688 A1 | 12/2001 | Rignell et al. | |
| 2002/0016956 A1 * | 2/2002 | Fawcett | 717/11 |
| 2002/0077094 A1 * | 6/2002 | Leppanen | 455/420 |
| 2002/0078209 A1 * | 6/2002 | Peng | 709/227 |
| 2002/0091799 A1 | 7/2002 | Katz et al. | |
| 2002/0100035 A1 | 7/2002 | Kenyon et al. | |
| 2002/0131404 A1 * | 9/2002 | Mehta et al. | 370/352 |
| 2002/0157090 A1 | 10/2002 | Anton, Jr. | |
| 2002/0177437 A1 | 11/2002 | Chesavage et al. | |
| 2002/0178178 A1 * | 11/2002 | Peng | 707/204 |
| 2002/0194578 A1 | 12/2002 | Irie et al. | |
| 2003/0023516 A1 * | 1/2003 | Sharrow et al. | 705/28 |
| 2003/0046676 A1 | 3/2003 | Cheng et al. | |
| 2003/0078036 A1 | 4/2003 | Chang et al. | |
| 2003/0100297 A1 * | 5/2003 | Riordan et al. | 455/418 |
| 2003/0105847 A1 * | 6/2003 | Jennery et al. | 709/223 |
| 2003/0124974 A1 * | 7/2003 | Asami | 455/3.02 |
| 2003/0145315 A1 | 7/2003 | Aro et al. | |
| 2004/0003266 A1 | 1/2004 | Moshir et al. | |
| 2004/0003389 A1 | 1/2004 | Reynar et al. | |
| 2004/0006630 A1 | 1/2004 | Friend et al. | |
| 2004/0015953 A1 | 1/2004 | Vincent | |
| 2004/0024795 A1 | 2/2004 | Hind et al. | |
| 2004/0038675 A1 * | 2/2004 | Criss et al. | 455/419 |
| 2004/0068724 A1 | 4/2004 | Gardner et al. | |
| 2004/0107417 A1 | 6/2004 | Chia et al. | |
| 2004/0117785 A1 | 6/2004 | Kincaid | |
| 2004/0158817 A1 | 8/2004 | Okachi et al. | |
| 2004/0181790 A1 | 9/2004 | Herrick | |
| 2004/0188510 A1 | 9/2004 | Sprigg et al. | |
| 2004/0188511 A1 | 9/2004 | Sprigg et al. | |
| 2004/0205745 A1 | 10/2004 | Piazza | |
| 2004/0224674 A1 | 11/2004 | O'Farrell et al. | |
| 2004/0230965 A1 | 11/2004 | Okkonen | |
| 2005/0044235 A1 | 2/2005 | Balahura et al. | |
| 2005/0118991 A1 | 6/2005 | Koganti et al. | |
| 2005/0132357 A1 | 6/2005 | Shell et al. | |
| 2005/0268296 A1 | 12/2005 | Marolia et al. | |
| 2006/0031262 A1 | 2/2006 | Satoh et al. | |
| 2006/0206888 A1 | 9/2006 | Mavrinac et al. | |
| 2006/0277408 A1 | 12/2006 | Bhat et al. | |
| 2007/0006222 A1 | 1/2007 | Maier et al. | |
| 2007/0074203 A1 | 3/2007 | Curtis et al. | |
| 2007/0169073 A1 | 7/2007 | O'Neill et al. | |
| 2007/0169093 A1 | 7/2007 | Logan et al. | |
| 2007/0293212 A1 | 12/2007 | Quon et al. | |
| 2008/0003991 A1 | 1/2008 | Sievers et al. | |
| 2008/0028385 A1 | 1/2008 | Brown et al. | |
| 2008/0148250 A1 | 6/2008 | Motta | |
| 2008/0270481 A1 | 10/2008 | Augustine | |
| 2008/0270485 A1 | 10/2008 | Yu et al. | |
| 2008/0281828 A1 | 11/2008 | Swartz et al. | |
| 2009/0077263 A1 | 3/2009 | Koganti et al. | |
| 2010/0242034 A1 | 9/2010 | Rugh et al. | |
| 2011/0078675 A1 | 3/2011 | Van et al. | |
| 2011/0252415 A1 | 10/2011 | Ricci | |
| 2012/0180037 A1 | 7/2012 | McCaleb et al. | |

(56) References Cited

U.S. PATENT DOCUMENTS

| | | |
|---|---|---|
| 2013/0047145 A1 | 2/2013 | Cui |
| 2013/0139139 A1 | 5/2013 | Mallur et al. |
| 2013/0198732 A1 | 8/2013 | Fujita |
| 2013/0326493 A1 | 12/2013 | Poonamalli et al. |
| 2014/0053145 A1 | 2/2014 | Steigleder |
| 2014/0128054 A1 | 5/2014 | Koganti et al. |
| 2014/0130035 A1 | 5/2014 | Desai et al. |
| 2014/0208306 A1 | 7/2014 | Halder et al. |

FOREIGN PATENT DOCUMENTS

| | | |
|---|---|---|
| DE | 19543843 A1 | 5/1997 |
| EP | 0841615 A2 | 5/1998 |
| EP | 0959635 A1 | 11/1999 |
| EP | 1672545 A1 | 6/2006 |
| GB | 2348721 | 10/2000 |
| JP | 1198477 | 8/1989 |
| JP | 5210507 A | 8/1993 |
| JP | 08106393 | 4/1996 |
| JP | 9292980 A | 11/1997 |
| JP | 10021061 A | 1/1998 |
| JP | 10049354 A | 2/1998 |
| JP | 11110197 A | 4/1999 |
| JP | 11225359 A | 8/1999 |
| JP | H11331937 A | 11/1999 |
| JP | 11514760 T | 12/1999 |
| JP | 2000132355 | 5/2000 |
| JP | 2000132397 A | 5/2000 |
| JP | 2000276335 A | 10/2000 |
| JP | 2001043073 A | 2/2001 |
| JP | 2001053882 A | 2/2001 |
| JP | 2001101219 A | 4/2001 |
| JP | 2001251380 A | 9/2001 |
| JP | 2001256053 A | 9/2001 |
| JP | 2001296994 A | 10/2001 |
| JP | 2001337832 A | 12/2001 |
| JP | 2001356912 A | 12/2001 |
| JP | 2002215692 A | 8/2002 |
| JP | 2002278767 A | 9/2002 |
| JP | 2005174048 A | 6/2005 |
| JP | 2008536344 A | 9/2008 |
| JP | 2009134589 A | 6/2009 |
| JP | 2012091840 A | 5/2012 |
| KR | 19990057991 | 7/1999 |
| KR | 1020020009741 | 2/2002 |
| KR | 20030030044 A | 4/2003 |
| KR | 20030033396 A | 5/2003 |
| KR | 20040069963 | 8/2004 |
| RU | 2233033 C2 | 7/2004 |
| TW | 361057 | 6/1999 |
| TW | 448404 B | 8/2001 |
| TW | 473660 B | 1/2002 |
| TW | 503368 B | 9/2002 |
| WO | WO9102313 A1 | 2/1991 |
| WO | WO9729606 A1 | 8/1997 |
| WO | WO9838820 | 9/1998 |
| WO | WO 99045465 | 9/1999 |
| WO | WO-00035117 | 6/2000 |
| WO | WO00077614 | 12/2000 |
| WO | WO0169888 | 9/2001 |
| WO | WO0193030 A1 | 12/2001 |
| WO | WO02046914 | 6/2002 |
| WO | WO02075525 | 9/2002 |
| WO | WO-03083667 A1 | 10/2003 |
| WO | WO-2007056954 A1 | 5/2007 |

OTHER PUBLICATIONS

Advisory Action mailed Jan. 22, 2010, for U.S. Appl. No. 10/740,355, filed Dec. 18, 2003.
Advisory Action mailed Jul. 17, 2008, for U.S. Appl. No. 10/740,355, filed Dec. 18, 2003.
Advisory Action mailed Mar. 19, 2009, for U.S. Appl. No. 10/975,973, filed Oct. 27, 2004.
Advisory Action mailed Sep. 10, 2007, for U.S. Appl. No. 10/975,973, filed Oct. 27, 2004.
Appeal Brief mailed Dec. 9, 2008, for U.S. Appl. No. 10/061,875, filed Jan. 31, 2002.
Appeal Brief mailed Mar. 25, 2010, for U.S. Appl. No. 10/740,355, filed Dec. 18, 2003.
Final Office Action mailed Dec. 17, 2007, for U.S. Appl. No. 10/740,355, filed Dec. 18, 2003.
Final Office Action mailed Dec. 18, 2008, for U.S. Appl. No. 10/975,973, filed Oct. 27, 2004.
Final Office Action mailed Dec. 24, 2009, for U.S. Appl. No. 10/975,973, filed Oct. 27, 2004.
Final Office Action mailed Jul. 22, 2008, for U.S. Appl. No. 10/061,875, filed Jan. 31, 2002.
Final Office Action mailed Jul. 23, 2009, for U.S. Appl. No. 10/740,355, filed Dec. 18, 2003.
Final Office Action mailed Jun. 27, 2007, for U.S. Appl. No. 10/975,973, filed Oct. 27, 2004.
Final Office Action mailed Mar. 9, 2007, for U.S. Appl. No. 10/061,875, filed Jan. 31, 2002.
Final Office Action mailed May 18, 2004, for U.S. Appl. No. 10/061,875, filed Jan. 31, 2002.
Final Office Action mailed Nov. 2, 2005, for U.S. Appl. No. 10/061,875, filed Jan. 31, 2002.
Final Office Action mailed Oct 6, 2006, for U.S. Appl. No. 10/975,973, filed Oct. 27, 2004.
International Search Report—PCT/US03/02895, International Searching Authority—US, Jul. 9, 2003.
Non-Final Office Action mailed Apr. 7, 2010, for U.S. Appl. No. 10/975,973, filed Oct. 27, 2004.
Non-Final Office Action mailed Jan. 26, 2005, for U.S. Appl. No. 10/061,875, filed Jan. 31, 2002.
Non-Final Office Action mailed Jan. 29, 2007, for U.S. Appl. No. 10/975,973, filed Oct. 27, 2004.
Non-Final Office Action mailed Jul. 7, 2003, for U.S. Appl. No. 10/061,875, filed Jan. 31, 2002.
Non-Final Office Action mailed Jul. 26, 2007, for U.S. Appl. No. 10/061,875, filed Jan. 31, 2002.
Non-Final Office Action mailed Jun. 12, 2008, for U.S. Appl. No. 10/975,973, filed Oct. 27, 2004.
Non-Final Office Action mailed Mar. 3, 2008, for U.S. Appl. No. 10/061,875, filed Jan. 31, 2002.
Non-Final Office Action mailed May 1, 2006, for U.S. Appl. No. 10/975,973, filed Oct. 27, 2004.
Non-Final Office Action mailed May 28, 2009, for U.S. Appl. No. 10/975,973, filed Oct. 27, 2004.
Non-Final Office Action mailed Nov. 28, 2007, for U.S. Appl. No. 10/975,973, filed Oct. 27, 2004.
Non-Final Office Action mailed Oct. 31, 2006, for U.S. Appl. No. 10/061,875, filed Jan. 31, 2002.
Response to Final Office Action mailed Apr. 17, 2008, for U.S. Appl. No. 10/740,355, filed Dec. 18, 2003.
Response to Final Office Action mailed Aug. 26, 2007, for U.S. Appl. No. 10/975,973, filed Oct. 27, 2004.
Response to Final Office Action mailed Aug. 29, 2007, for U.S. Appl. No. 10/975,973, filed Oct. 27, 2004.
Response to Final Office Action mailed Dec. 4, 2006, for U.S. Appl. No. 10/975,973, filed Oct. 27, 2004.
Response to Final Office Action mailed Dec. 27, 2005, for U.S. Appl. No. 10/061,875, filed Jan. 31, 2002.
Response to Final Office Action mailed Feb. 18, 2009, for U.S. Appl. No. 10/975,973, filed Oct. 27, 2004.
Response to Final Office Action mailed Jan. 22, 2010, for U.S. Appl. No. 10/740,355, filed Dec. 18, 2003.
Response to Final Office Action mailed Mar. 16, 2010, for U.S. Appl. No. 10/975,973, filed Oct. 27, 2004.
Response to Final Office Action mailed Mar. 30, 2006, for U.S. Appl. No. 10/061,875, filed Jan. 31, 2002.
Response to Final Office Action mailed May 9, 2007, for U.S. Appl. No. 10/061,875, filed Jan. 31, 2002.
Response to Final Office Action mailed Nov. 21, 2006, for U.S. Appl. No. 10/975,973, filed Oct. 27, 2004.

(56) References Cited

OTHER PUBLICATIONS

Response to Final Office Action mailed Sep. 20, 2004, for U.S. Appl. No. 10/061,875, filed Jan. 31, 2002.
Response to Final Office Action mailed Sep. 22, 2008, for U.S. Appl. No. 10/061,875, filed Jan. 31, 2002.
Response to Final Office Action mailed Sep. 23, 2009, for U.S. Appl. No. 10/740,355, filed Dec. 18, 2003.
Response to Non-Final Office Action mailed Apr. 22, 2007, for U.S. Appl. No. 10/975,973, filed Oct. 27, 2004.
Response to Non-Final Office Action mailed Apr. 28, 2005, for U.S. Appl. No. 10/061,875, filed Jan. 31, 2002.
Response to Non-Final Office Action mailed Aug. 23, 2006, for U.S. Appl. No. 10/975,973, filed Oct. 27, 2004.
Response to Non-Final Office Action mailed Aug. 30, 2009, for U.S. Appl. No. 10/975,973, filed Oct. 27, 2004.
Response to Non-Final Office Action mailed Dec. 23, 2007, for U.S. Appl. No. 10/061,875, filed Jan. 31, 2002.
Response to Non-Final Office Action mailed Jan. 9, 2004, for U.S. Appl. No. 10/061,875, filed Jan. 31, 2002.
Response to Non-Final Office Action mailed Jan. 31, 2007, for U.S. Appl. No. 10/061,875, filed Jan. 31, 2002.
Response to Non-Final Office Action mailed Mar. 4, 2008, for U.S. Appl. No. 10/975,973, filed Oct. 27, 2004.
Response to Non-Final Office Action mailed Mar. 24, 2009, for U.S. Appl. No. 10/740,355, filed Dec. 18, 2003.
Response to Non-Final Office Action mailed May 26, 2008, for U.S. Appl. No. 10/061,875, filed Jan. 31, 2002.
Response to Non-Final Office Action mailed Sep. 17, 2008, for U.S. Appl. No. 10/975,973, filed Oct. 27, 2004.
Supplementary European Search Report—EP03715962, Search Authority—Munich Patent Office, Nov. 24, 2010.
Dolgolaptev, V.G., "Rabota v Windows 95 na primerakh", (Operation in Windows 95 by Examples)—Moscow, Vostochnaya Knizhnaya Kompania (East Book Company), published on 1997, 464 pp.
Castro P., et al., "Before-Commit Client State Management Services for AJAX Applications", Hot Topics in Web Systems and Technologies, 2006. Hotweb '06. 1ST IEEE Workshop on, IEEE, PI, Nov. 1, 2006, pp. 1-12, XP031082790, ISBN: 978-1-4244-0595-4, abstract sections I., II.C, II.D, III., IV.F, IV.G, V.C, V.D, VII.
Mesbah A., et al., "An Architectural Style for AJAX", Software Architecture, 2007, WICSA '07. The Working IEEE/IFIP Conference on Jan. 1, 2007, pp. 1-10, XP031013840 ISBN: 978-0-7695-2744-4, abstract sections 2.2, 4.2, 4.3, 4.4.
Open Mobile Alliance, "DS Protocol Approved Version 1.2 OMA-TS-DS_Protocol-V1_2-2-20060710-A", Internet Citation, [Online] Jul. 10, 2006, XP002456758.Retrieved from the Internet: <URL:http://www.openmobilealliance.org/release_program/docs/DS/V1_2-2-200607 10-A/OMA-TS-DS-Protocol-V1_2-20060710-A.pdf> [retrieved on Oct. 26, 2007] sections 5., 6.12, 9.
OMA "SyncML HTTP Binding," Approved version 1.2—Feb. 21, 2007, Open Mobile Alliance, OMA-TS-SyncML_HTTPBinding-V1_2-20070221-A, pp. 1-24.
Baggiolini et al., "Toward Automatic, Run-time Fault Management for Component-Based Applications", 1998 Springer, pp. 1-5, <http://link.springercom/content/pdf/10.1007/3-540-69687-3_67.pdf>.
Oma "SyncML Meta Information," Approved version 1.2—Feb. 21, 2007, Open Mobile Alliance, OMA-TS-SyncML_MetaInfo-V1_2-20070221-A, pp. 1-25.
Oma "SyncML OBEX Binding," Approved version 1.2—Feb. 21, 2007, Open Mobile Alliance, OMA-TS-SyncML_OBEXBinding-V1_2-20070221-A, pp. 1-30.
Oma "SyncML Representation Protocol," Approved version 1.2—Feb. 21, 2007, Open Mobile Alliance, OMA-SyncML-RepPro-V1_2-20070221-A, pp. 1-60.
Oma "SyncML Server Alerted Notification," Approved version 1.2—Feb. 21, 2007, Open Mobile Alliance, OMA-TS-SyncML_SAN-V1_2-20070221-A, pp. 1-17.
Oma "SyncML WSPBinding," Approved version 1.2—Feb. 21, 2007, Open Mobile Alliance, OMA-TS-SyncML_WSPBinding-V1_2-20070221-A, pp. 1-17.
SyncML Representation Protocol, Version 1.0.1, [retrieved on Jun. 15, 2001], 105 pages, Retrieved from the Internet: URL: http://www.syncml.org/docs/syncml_represent_v101_20010615.pdf.
Tijs Van Der Storm., "Continuous Release and Upgrade of Component-Based Software", 2005 ACM, Sep. 5, 2005, SMC'05, pp. 43-57, http://dl.acm.org/results.cfm?h=1&cfid=603384239&cftoken=64589296.
Grundy et al., "Engineering Plug-In SW Components to Support Collaborative Work", Software—Practice and Experience, 2002, vol. 32, Wiley, pp. 938-1013. <https://www.cs.auckland.ac.nz/~john.../spe2002.p...>.
La Manna V.P, "Dynamic Software Update for Component-based Distributed Systems", Jun. 2011, Boulder, Colorado, USA, pp. 1-8; <http://dl.acm.org/results.cfm?h=1&source_query=&&cfid=304794976&cftoken=79323359>.
Tromcek Z., "Semi-Automatic Component Upgrade with RefactoringNG", 2011 IEEE, pp. 907-910, http://ieeexplore.ieee.org/stamp/stamp.jsp?tp=&arnumber=6078310.
Gui N., et al., "A Framework for Adaptive Real-Time Applications: the Declarative Real-Time OSGi Component Model", ACM, ARM, Leuven, Belgium, Dec. 1, 2008, pp. 35-40.
Lucredio D., et al., "Orion—A Component-Based Software Engineering Environment", Journal of Object Technology, vol. 3, No. Apr. 4, 2004, pp. 51-74.
Yang X., et al., "A Component-based Software Framework for Product Lifecycle Information Management for Consumer Products", Consumer Electronics, IEEE Transactions on, May 2007, pp. 1195-1203.
Anosi., et al., "Managing and Assessing the Risk of Component Upgrades", 2012 IEEE, Please'12, Jun. 4, 2012, pp. 9-12.
Gu., et al., "Low-disruptive Dynamic Updating of Java Applications", 2014 Elsevier, vol. 56, Issue 9, Sep. 2014, pp. 1086-1098.
Nguyen T N., "Component-based Software Update Process in Collaborative Software Development", 2008 IEEE, APSEC'08, Dec. 3-5, 2008, pp. 437-444.

* cited by examiner

SYSTEM AND METHOD FOR UPDATING DATASET VERSIONS RESIDENT ON A WIRELESS DEVICE

BACKGROUND OF THE INVENTION

I. Field of the Invention

The present invention generally relates to wireless networks and computer communications across wireless networks. More particularly, the invention relates to the updating of the version of an application or data resident on a wireless device when the wireless device connects to a download server that has a more recent version of the wireless device resident application or data.

II Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). Some wireless devices, such as select cellular telephones, may have an installed application programming computer platform that allows software developers to create software applications that operate on the wireless device.

It is anticipated that systems and methods will be developed to download applications to a wireless device. Accordingly, it is desirable to have a system and method by which applications and data on a wireless device may be updated efficiently, taking into account the environment, constraints and impacts of transferring information in a wireless network.

SUMMARY OF THE INVENTION

Embodiments of the invention include systems and methods for selectively updating the versions of stored datasets on a wireless device that selectively communicates to a wireless network and downloads datasets, such as software applications, information and other data, from download servers on the wireless network. One system includes one or more wireless devices where each wireless device has a computer platform with at least one data file resident thereon, and the wireless device is in selective communication to a wireless network and downloads datasets from download servers across the wireless network. The computer platform of the wireless device further has a resident dataset version summary file that identifies the version of each resident dataset, and the version summary file is updated whenever a resident dataset is updated. This system also includes one or more download servers that are in selective communication to the wireless network and are each selectively in communication with the one or more wireless devices and selectively downloading datasets thereto, with each download server updating its resident datasets that are selectively downloadable to wireless devices and recording the version of each specific updated downloaded server resident dataset.

In one embodiment, when the wireless device attempts to communicate with a download server across the wireless network, the computer platform of the wireless device compares the version of each specific resident dataset listed in the resident dataset version summary file with the version of the downloadable dataset resident on the download server to thereby determine if the version of the wireless device resident dataset is different from the version of the download server resident dataset. The stored record indicating the version of the download server resident dataset can be held in a update summary file resident on the download server, and upon a wireless device attempting to communicate with at least one download server across the wireless network, the computer platform of the wireless device comparing the update file of the download server to the version summary file of the wireless device to thereby determine if the versions of the wireless device resident datasets are different from the versions of the download server resident datasets. The simple comparison of the update summary files will inform the wireless device if a more recent version of any of the wireless device datasets is present on the download server without needing to make the comparison sequentially, i.e., comparing dataset to dataset.

After the wireless device determines the version of the wireless device resident dataset is different from the version of the download server resident dataset, the computer platform of the wireless device downloads the download server resident dataset to supplant the wireless device resident version and be executable on the wireless device. To download the more recent version of the dataset from the download server, the computer platform of the wireless device can prompt the user of the wireless device to communicate with the download server to download the different version of the download server resident dataset to be executable on the wireless device. This function is especially useful if the owner of the wireless device will be charged for the network connection time to download the new version of the application or data from the download server. Otherwise, the computer platform of the wireless device can automatically download the different download server resident dataset to be executable on the wireless device once the newer version of the dataset is detected on the download server.

A method for selectively updating the versions of stored datasets on a wireless device includes communicating from the wireless device to the download server across the wireless network, comparing, at the computer platform of the wireless device, the version of each specific resident dataset listed in the resident dataset version summary file with the version of the downloadable dataset resident on the download server; and determining if the version of the wireless device resident dataset is different from the version of the download server resident dataset based upon the comparison. The method may include, upon determining the version of the wireless device resident dataset is different from the version of the download server resident dataset, downloading the different download server resident dataset to the computer platform of the wireless device from the download server to be executable on the wireless device. To download the new version on the download server, the method can include prompting the user of the wireless device to communicate with the download server to download the different version of the download server resident dataset to be executable on the wireless device or such downloading can be done automatically upon determining the download server resident dataset is a different version than the wireless device resident dataset.

If the stored records indicating the version of the download server resident dataset is held in a version update summary file resident on the download server, comparing the wireless device and download server datasets may be performed by comparing at the computer platform of the wireless device the version update summary file of the download server to the version summary file of the wireless device to thereby determine if the versions of the wireless device resident datasets are different from the versions of the download server resident datasets.

The above method may include a wireless device that can perform the above functions in creating and comparing wireless device version summary file with an update summary file of the download server to determine if the versions of the wireless device resident datasets are different from the versions of the download server resident datasets. Further, because the method is executable on the computer platform of the wireless device, the method may include a program, in a computer readable medium, that directs a wireless device having a computer platform to perform the steps of the method.

DETAILED DESCRIPTION OF THE INVENTION

Introduction

Figure 1:
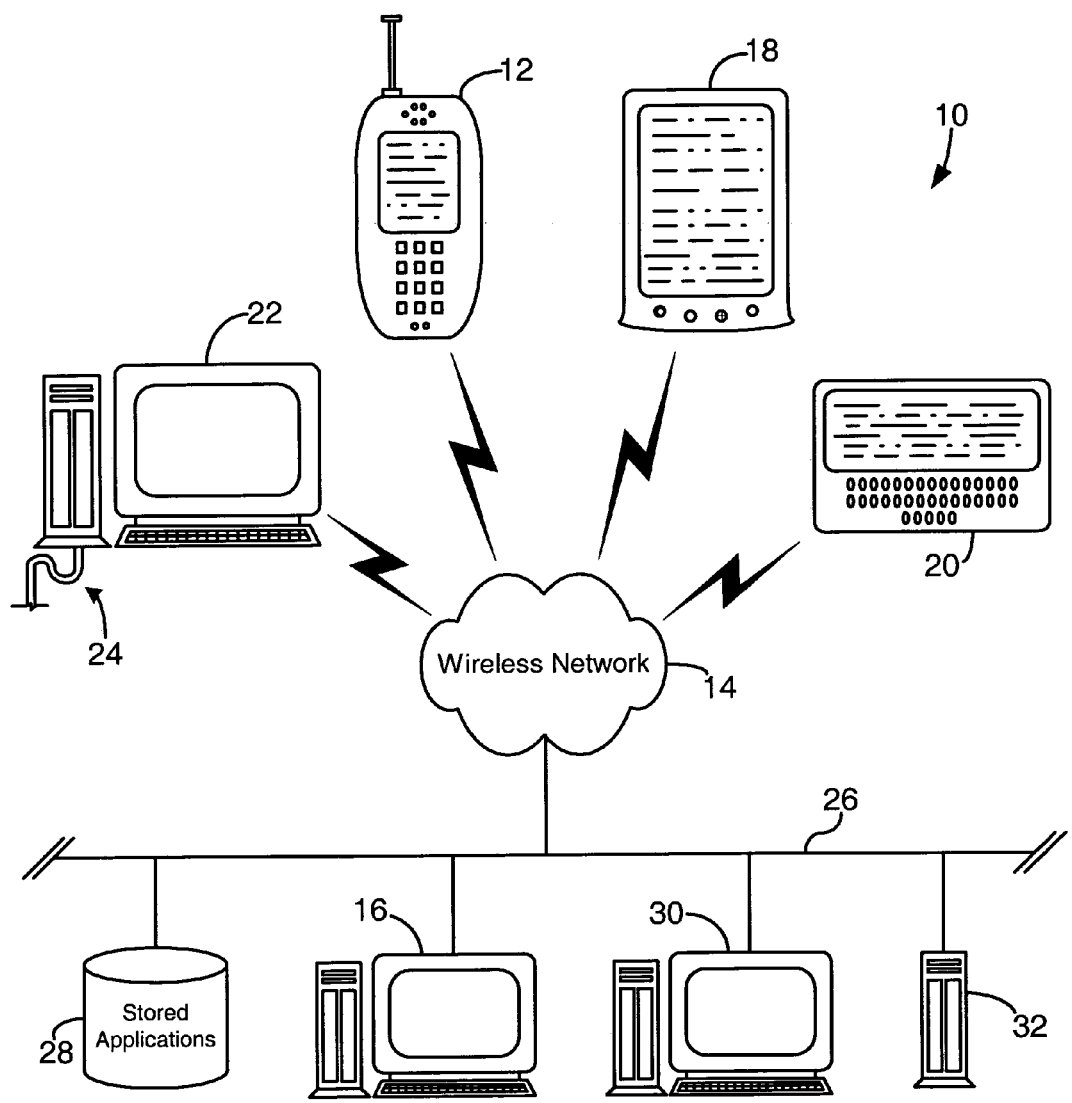
FIG. 1 is a representative diagram of a wireless network and the computer hardware and wireless devices that can be used within the system.

Systems and methods are anticipated that provide for the downloading of software applications to a wireless device. Software applications can come pre-loaded at the time the wireless device is manufactured, or the user may later request that additional programs be downloaded over cellular telecommunication carrier networks, where the programs are executable on the wireless device. As a result, users of wireless devices can customize their wireless devices with programs, such as games, printed media, stock updates, news, or any other type of information or program available for download from application download servers through the wireless network.

In one scenario, if the user of the wireless device desires to download and use a software application or other data using a wireless network, the user will typically either call a service provider or contact the service provider through other means, such as through an Internet access, and the service provider will either transmit the application or data to the wireless device across the wireless network or allow the user access a network site where the application or data is downloadable or accessible. To connect to the application download server, the wireless device bridges a communication connection to the wireless network, such as a cellular network, and then attempts to contact an application download server where the desired software application is resident. Once the wireless device contacts the application download server, an initial connection is made and the application download server determines what applications and data are available to the wireless device and sends the appropriate information, such as a menu, for display on the wireless device so the user can learn of the available applications and data. After access is provided to the downloadable applications, the user of the wireless device can download any of the available applications or data.

A problem that may arise is that the version of the application or data that the wireless device downloads to be resident thereupon can be updated or altered at the application download server, and the wireless device resident application or data has no simple manner to be likewise updated. The update problem is exacerbated as the wireless device does not always communicate with the application download server every time the wireless device bridges a communication to the wireless network. Because the communication connection from the wireless device to the application download server can be expensive (especially in a cellular network), it is otherwise very expensive for the wireless device to periodically connect to the application download server and check for more recent version of application or software. Furthermore, while each wireless device resident application or data can be checked against its parallel version resident on the download server every time a connection is made to the download server, such checking would lengthen the connection time and cause more expense to the wireless device owner.

Accordingly, systems and methods consistent with the present invention include updating applications and data resident on a wireless device with the most recent version stored on a download server that the wireless device is connected to. Such systems and methods should be able to determine if more recent versions of the wireless device resident applications and data are present on the download server without significantly lengthening the connection duration in order to effect a full comparison of all wireless device resident applications and data. It is thus to the provision of such a system and method of checking and updating wireless device resident applications and data that the present invention is primarily directed.

It is an object to provide systems and methods whereby the datasets, such as applications, information and other data, resident on a wireless device can be updated with the most recent version of the dataset resident on a download server that the wireless device is connected to. The present invention allows a rapid determination as to whether more recent versions of the wireless device resident datasets are present on the download server, and such determination does not significantly lengthen the connection duration between the wireless device and download server. The present invention thus provides an advantage in that it gives a wireless device the ability to quickly execute a full comparison of dataset versions with a download server and download any newer version of a wireless device resident dataset.

Exemplary Embodiment of the Present Invention

With reference to the figures in which like numerals represent like elements throughout, FIG. 1 illustrates an embodiment of a system 10 for providing subscribed software applications to one or more wireless devices, such as cellular telephone 12, in communication across a wireless network 14 with at least one network server, such as application download server 16, that selectively downloads or provided access to software applications or other data to the wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or subcombination thereof.

The application download server 16 is shown here on a local server-side network 26 with other computer elements in communication with the wireless network 14, such as a database 28 with stored applications and data that contains software applications and data that are accessible and downloadable to the wireless devices 12, 18, 20, 22. There is also shown other network servers, such as server 30 and stand-alone network server 32. The servers 30 and 32 can be application or data download servers, or other types of servers that interact with the wireless devices 12, 18, 20, 22 as are known in the art. The servers 16, 30, 32 may have software applications, patches, files, keys, graphics data, compression algorithms, and any type of general data, collectively referred to hereinafter as "datasets," resident thereupon that can be accessed by the wireless devices 12, 18, 20, 22 as is further described herein. It should be noted that server-side functions as described herein can be performed on one server, such as application download server 16. Further, a computer server-side computer platform can provide separate services and processes to the wireless devices 12, 18, 20, 22 across the wireless network 14.

Figure 2:
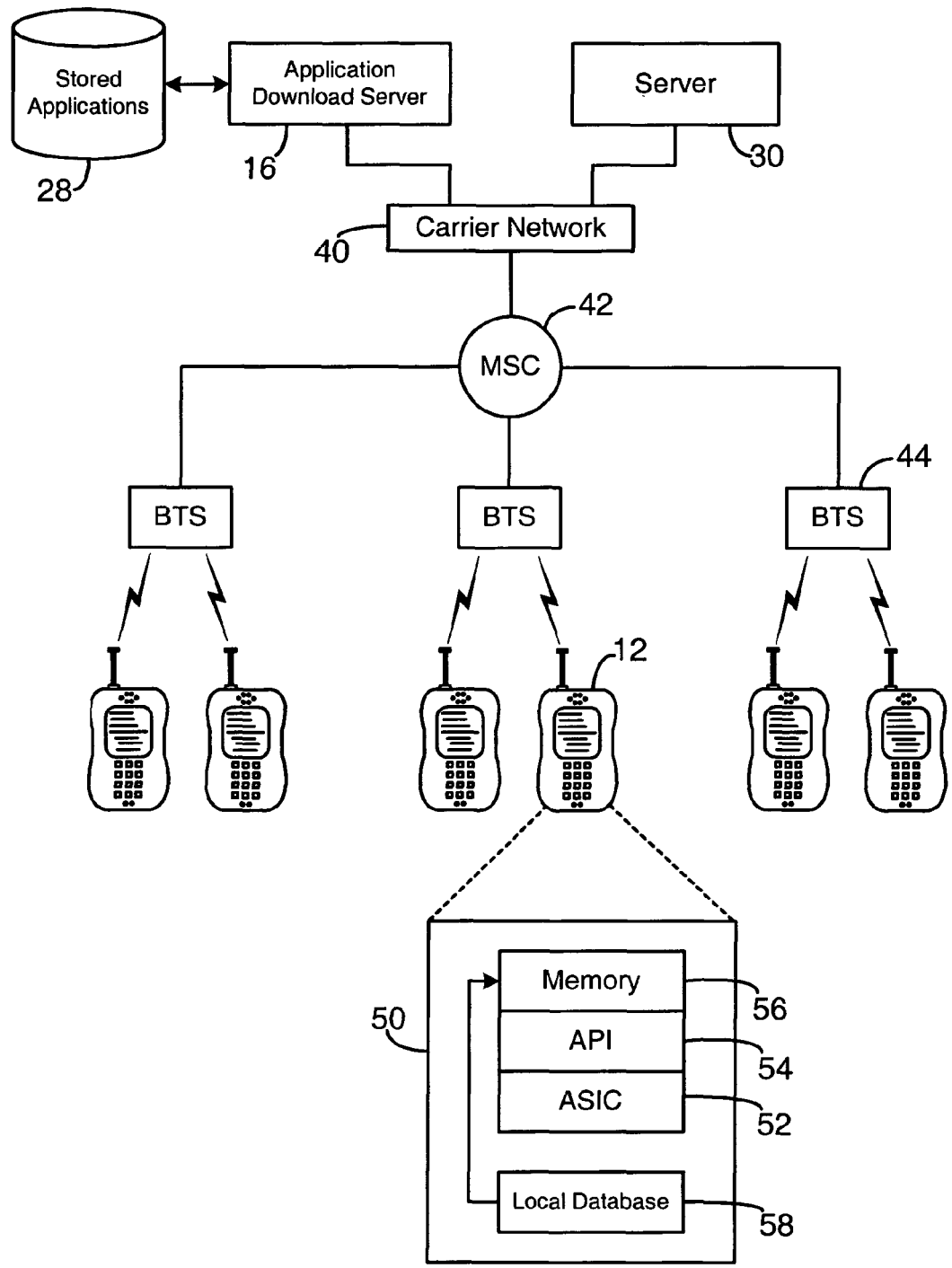
FIG. 2 is a block diagram of the hardware components of the wireless network providing communication between different wireless devices, an application download server, a second network server, and the stored application database.

FIG. 2 is a block diagram that more fully illustrates the components of the wireless network 14 and interrelation of the elements of the system 10. The wireless network 14 is merely exemplary and can include any system whereby remote modules, such as wireless devices 12, 18, 20, 22, communicate over-the-air between and among each other and/or between and among components of a wireless network 14, including, without limitation, wireless network carriers and/or servers, as well as including a non-wireless network alone or in combination with a wireless network. The application download server 16 and the stored applications database 28, other servers 30, 32, will be present on the cellular data network with any other components that are needed to provide cellular telecommunication services. The application download server 16, and/or other servers 30, 32 communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications and display data transmitted from the application download server 16 or other network servers 30, 32. The computer platform 50 may also include an application-specific integrated circuit ("ASIC") 52, or other processor, microprocessor, logic circuit, or other data processing device.

The ASIC 52 or other processor executes the application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications, file, or data not actively used in memory 56, such as the software applications or downloaded from the application download server 16. The local database 58 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 12, can access and download many types of applications, such as games and stock monitors, or simply data such as news and sports-related data. The downloaded data can be immediately displayed on the display or stored in the local database 58 when not in use. The software applications can be treated as a regular software application resident on the wireless device 12, 18, 20, 22, and the user of the wireless device can selectively upload stored resident applications from the local database 58 to memory 56 for execution on the API 54. The end-user of the wireless device 12, 18, 20, 22 can also selectively delete a software application from the local database 58 whereby other applications and data can be downloaded into the cleared storage space.

Figure 3:
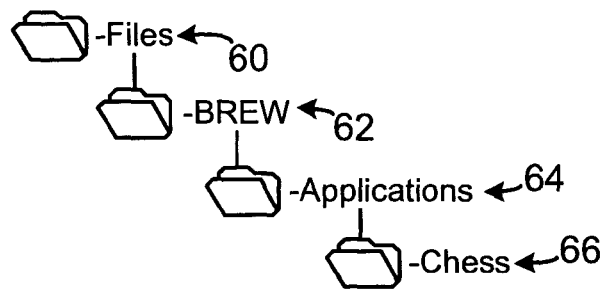
FIG. 3 is a file tree illustrating an exemplary file structure resident on the computer platform of the wireless device.

With reference to FIG. 3, the computer platform 50 of the wireless device (such as cellular telephone 12) will have a data or file structure resident thereon. The category Files 60 within it the API file called BREW 62, representing the API in the platform, in this case the BREW™ API developed by QUALCOMM®, Incorporated, and BREW 62 contains an applications file 64 with a specific chess game held in a chess folder 66. All of these files can be "versioned" wherein updates to the data in each file give the file a different version to identify what changes have been made in the data. The server, such as application download server 16, will keep its own resident copy of the application and data files such that a wireless device 12, 18, 20, 22 contacting the server can download copies of the applications and data to selectively overwrite the wireless device resident copy.

Figure 4:
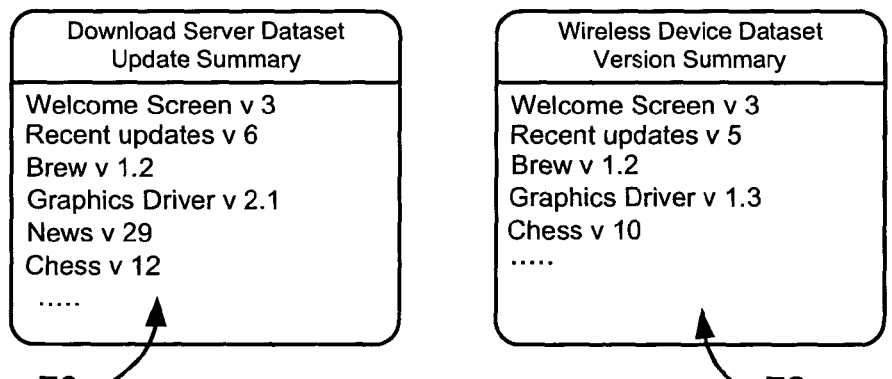
FIG. 4 illustrates the download server dataset update summary file and wireless device dataset version summary file, which are compared to determine if new versions of wireless device resident datasets are present on the download server.

The present invention allows the creation of "summary files" of the versions of some or all datasets resident on the wireless device 12, 18, 20, 22 or download server, such as application download server 16. As shown in FIG. 4, the download server 16, 30, 32 preferably maintains a download server dataset update summary file 70, and the wireless device 12, 18, 20, 22 will maintain wireless device dataset version summary file 72 that contain or reference some or all files on the server or computer platform 50 respectively.

The system 10 thus selectively updates the versions of stored datasets on a wireless device 12, 18, 20, 22 attempting to communicate with at least one download server (application download server 16) across the wireless network 14, through the computer platform 50 of the wireless device comparing the version of each specific resident dataset listed in the resident dataset version summary file 72 with the version of the downloadable dataset resident on the download server, preferably stored in a download server dataset update summary 70, to thereby determine if the version of the wireless device resident dataset is different from the version of the download server resident dataset. And upon determining the version of the wireless device resident dataset is different from the version of the download server resident dataset, the computer platform 50 of the wireless device can download the download server resident dataset to overwrite the old version of the application or data resident and be executable on the wireless device 12, 18, 20, 22. Other methods can be used on the download server 16, 30, 32 to provide version information to wireless devices 12, 18, 20, 22, such as a header for each dataset file, a direct comparison of the dataset after a predetermined duration since download, or a command can be present in the wireless device-download server handshake that informs the wireless device to compare a specific dataset to determine if the wireless device has the most recent version.

The download server dataset update summary file 70 can identify the versions of files or datasets resident on the download server, such as a graphics data that is present in a welcome screen file, device drivers such as a graphics driver file, and the chess file 66. The wireless device dataset version summary file 72 has parallel files to those resident on the download server dataset update summary file 70 and can compare each version of the datasets through a simple file comparison between the download server dataset update summary file 70 and the wireless device dataset version summary file 72 and locate different version numbers. The summary files 70 and 72 are shown here as having a greater number indicating a more recent version of the dataset. Other systems and method could be used to indicate the version difference as would be known in the art, such as an alphanumeric or other symbolic system that is predefined such that the computer platform 50 of the wireless device 12, 18, 20, 22 can determine if an individual download server resident dataset is a newer version than the wireless device resident dataset.

In the structure shown in FIG. 4, if a version number of the download server resident dataset is greater than the version number of the wireless device resident dataset, then the computer platform 50 of the wireless device 12, 18, 20, 22 will download the newer version of the dataset from the download server 16, 30, 32. After it has been determined that a newer dataset version is on the download server, the computer platform 50 of the wireless device 12, 18, 20, 22 can prompt the user of the wireless device 12, 18, 20, 22 to communicate with the download server to download the different version of the download server resident dataset to be executable on the wireless device. The prompting of the user to make the communication may be important in certain circumstances, such as if the owner of the wireless device 12, 18, 20, 22 will be billed for the communication connection. Otherwise, upon the determination that the version of the wireless device resident dataset is different from the version of the download server resident dataset, the computer platform 50 of the wireless device 12, 18, 20, 22 can automatically download the different download server resident dataset to overwrite the wireless device resident dataset.

Figure 5:
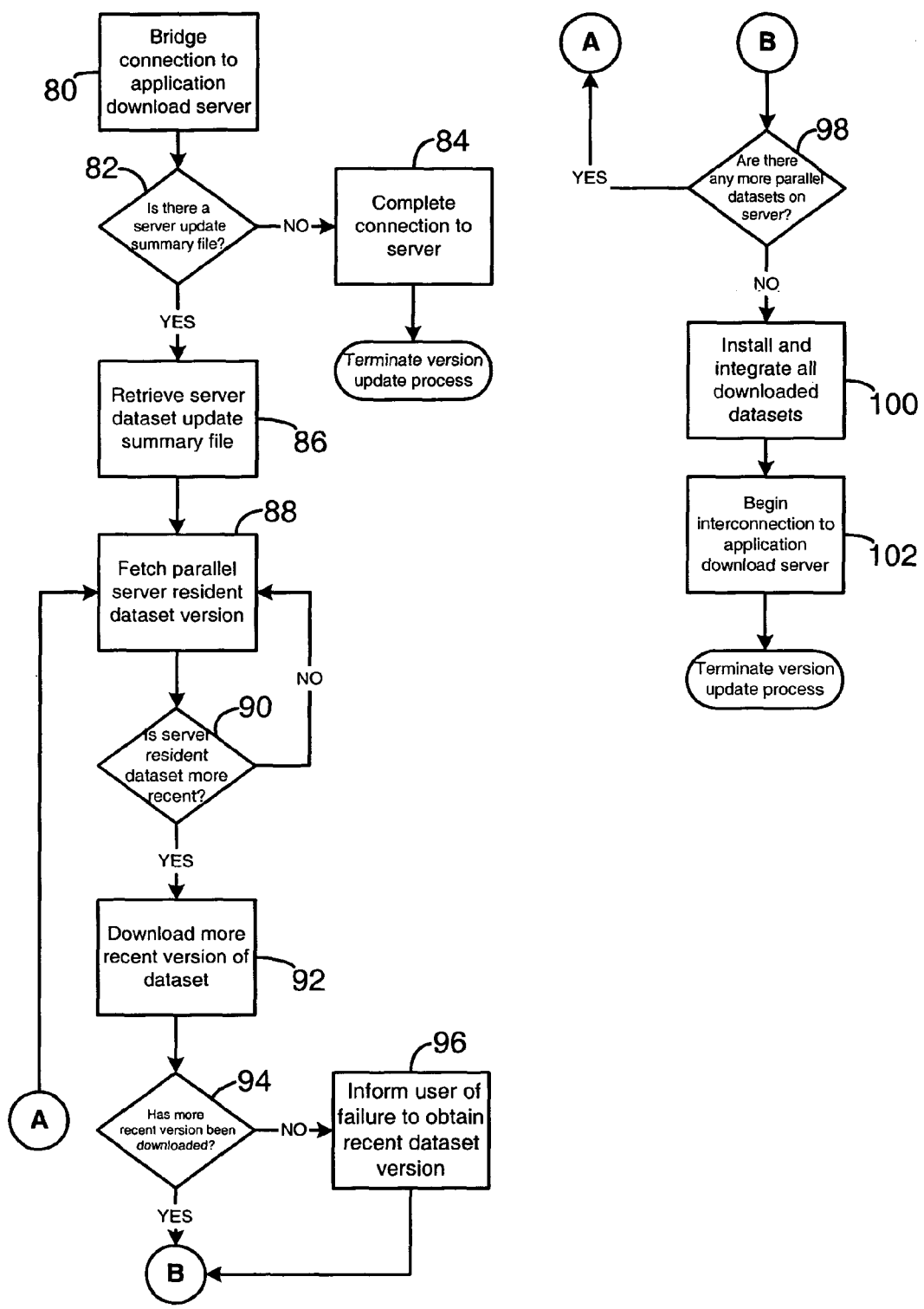
FIG. 5 is a flowchart illustrating the process executing on the wireless device in updating the wireless device resident datasets with newer versions present on a download server when the wireless device initially contacts the download server.

The specific process executing on the wireless device, such as cellular telephone 12, is shown in the flowchart of FIG. 5. The wireless device 12,18,20,22 bridges a connection to an application download server 16 (or other network server) as shown in step 80, and then determine whether there is a download server version dataset update summary file 70 present, as shown by decision 82. If the download server keeps track of changes to resident dataset versions in a manner other than an update summary file 70, then decision 82 would be made in accord with the other method. If there is not a download server dataset update summary file 70 present at decision 82 (or other version comparison method present), then the connection to the application download server 16 is otherwise completed step 84, and the version update process is terminated. If there is a download server dataset update summary file 70 present at decision 82, then the download server dataset update summary file 70 is retrieved by the wireless device 12,18,20,22 as shown at step 86, and the first parallel dataset version for which the wireless device has a resident copy of is fetched, as shown at step 88.

A determination is then made as to whether the download server resident dataset is a more recent version than the wireless device resident dataset, as shown at decision 90. If the download server dataset is not more recent at decision 90, then the process returns to step 88 to fetch the next download server resident dataset version. If the download server resident dataset is a more recent version at decision 90, then the wireless device downloads to the computer platform 50 the more recent version of the dataset from the download server, as shown at step 92. A check is made to determine if the more recent version of the dataset was downloaded, as shown at decision 94. If the more recent version of the dataset was not downloaded at decision 92, then the user of the wireless device is informed of the failure to download the more recent dataset version, as shown at step 96, and the process continues to decision 98. Otherwise, if the more recent dataset version was downloaded at decision 94, then a determination is made as to whether there are any further datasets resident on the download server that are parallel to datasets resident on the wireless device 12, 18, 20, 22, as shown at decision 98.

If there are more parallel datasets on the download server at decision 98, then the process returns to step 88 wherein another parallel download server resident dataset is fetched. If there are no further parallel download server resident datasets present at decision 98, then the downloaded datasets are installed and integrated on the computer platform 50 of the wireless device 12, 18, 20, 22 as shown at step 100, and the interconnection between the wireless device and application download server 16 is begun, as shown at step 102. The interconnection between the wireless device and download server typically provides a menu or other data connectivity therebetween. After the interconnection is begun at step 102, the version update process is terminated.

Figure 6:
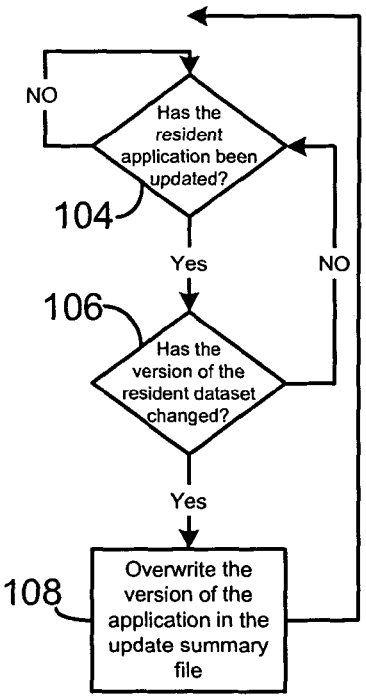
FIG. 6 is a flowchart illustrating the process executing on the download server in maintaining the most recent version of the download server resident datasets in the update summary file.

FIG. 6 illustrates the process executing on the download server 16, 30, 32 to insure that the download server dataset update summary file 70 has the most current version information. A sub-routine executing on the download server 16, 30, 32 makes a first determination as to whether the download server resident dataset has been updated, as shown at decision 104. If the resident dataset has not been updated, then the process enters a wait state by returning to decision 104, until a resident dataset is updated. Otherwise, if the resident dataset has been updated at decision 104, then a decision is made as to whether the version of the dataset as listed in the download server dataset update summary requires updating, as shown at decision 106. If the version of the resident dataset does not require updating, then the process returns to the wait state at decision 106 until an update is made to resident datasets. And if the version of the resident dataset has changed at decision 106, then the version of the dataset in the download server dataset update summary 70 is overwritten so that connecting wireless devices 12, 18, 20, 22 will be able to learn and download the newer version of the dataset.

The system 10 thus provides a method for selectively updating the versions of stored datasets on a wireless device 12, 18, 20, 22 including communicating from the wireless device 12, 18, 20, 22 to the download server 16, 30, 32 across the wireless network 14, comparing, at the computer platform 50 of the wireless device, the version of each specific resident dataset listed in the resident dataset version summary file 72 with the version of the downloadable dataset resident on the download server 16, 30, 32, and determining if the version of the wireless device resident dataset is different from the version of the download server resident dataset based upon the comparison. The method may further include downloading the different download server resident dataset to the computer platform 50 of the wireless device 12, 18, 20, 22 from the download server 16, 30, 32 to be executable on the wireless device upon determining the version of the wireless device resident dataset is different from the version of the download server resident dataset.

If the download server 16, 30, 32 stores the record indicating the version of the download server resident dataset in a version update file 70 the step of comparing, at the computer platform 50 of the wireless device 12, 18, 20, 22, the version of each specific resident dataset listed in the resident dataset version summary file 72 with the version of the downloadable dataset resident on the download server, is comparing the update summary file 70 of the download server to the version summary file 72 of the wireless device to thereby determine if the versions of the wireless device resident datasets are different from the versions of the download server resident datasets. The method can also include either prompting the user of the wireless device 12, 18, 20, 22 to communicate with the download server 16, 30, 32 to download the different version of the download server resident dataset to be executable on the wireless device, or automatically downloading the different download server resident dataset to the computer platform 50 of the wireless device upon determining the download server resident dataset is a different version than the wireless device resident dataset.

The invention further includes a wireless device 12, 18, 20, 22 including a computer platform 50 with at least one file resident thereon where the wireless device 12, 18, 20, 22 in selective communication to one or more network servers across a wireless network 14 with each network server selectively downloading datasets to the wireless device 12, 18, 20, 22. Upon the wireless device 12, 18, 20, 22 attempting to communicate with a download server 16, 30, 32 across the wireless network 13, the computer platform 50 of the wireless device compares the version of each specific resident dataset listed in the resident dataset version summary file 72 with the version of the downloadable dataset resident on the download server 16, 30, 32 to thereby determine if the version of the wireless device resident dataset is different from the version of the download server resident dataset. Preferably, upon determining the version of the wireless device resident dataset is different from the version of the download server resident dataset, the computer platform 50 of the wireless device downloads the download server resident dataset. The computer platform 50 of the wireless device can prompt the user of the wireless device 12, 18, 20, 22 to communicate with the download server 16, 30, 32 to download the different version of the download server resident dataset, or automatically download the different download server resident dataset to be executable on the wireless device 12, 18, 20, 22.

In one embodiment with an update summary file 70 resident on the download server, the computer platform 50 of the wireless device 12, 18, 20, 22 compares the update summary file 70 of the download server to the version summary file 72 of the wireless device to thereby determine if the versions of the wireless device resident datasets are different from the versions of the download server resident datasets.

The present invention includes a program resident in a computer readable medium, where the program directs a wireless device having a computer platform to perform the inventive steps of the method. The computer readable medium can be the memory 56 of the computer platform 50 of the cellular telephone 12, or other wireless device 18, 20, 22, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

The present invention may be implemented, for example, by operating portion(s) of the wireless network 14 to execute a sequence of machine-readable instructions, such as wireless platform 50, the application download server 16, and any other network server 30, 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A wireless device comprising:
 a wireless communications interface, for selectively communicating over a wireless network; and
 a computer platform, coupled to said wireless communications interface, for controlling said wireless communications interface, and for supporting a plurality of software objects each respectively having a version, said computer platform comprising:
 a memory, said memory storing said plurality of software objects; and
 a processor, coupled to said memory, for controlling said wireless communications interface and for supporting said plurality of software objects;
 wherein said processor is configured to:
 (a) create in said memory, a device version summary file, said device version summary file respectively storing the version associated with each of said plurality of software objects stored in said memory; and
 (b) after (a) performing a version update transaction with a server, said version update transaction comprising:
 (b)(1) determining whether said server has a server version summary file respectively storing a version associated with each software object stored on said server available for download to said wireless device; and
 (b)(2) based on determining that said server has a server version summary file:
 transferring said server version summary file to said wireless device;
 automatically comparing said device version summary file with said server version summary file to determine which ones of said plurality of software objects stored in said memory are associated with a software object stored on said server having an updated version; and based on there being at least one software object on said wireless device having an updated version on said server, automatically transferring the updated version of the at least one software object from said server to said wireless device, and installing each transferred and updated software object.

2. The wireless device of claim 1, wherein said plurality of software objects comprise at least one application for executing on said computer platform.

3. The wireless device of claim 2, wherein said at least one application comprises a game.

4. The wireless device of claim 2, wherein said at least one application comprises an application which had been downloaded from said server during a previous user communication session established with said server.

5. The wireless device of claim 2, wherein said at least one application comprises an application which was provided to said wireless device during a manufacture of said wireless device.

6. The wireless device of claim 2, wherein said at least one application comprises an application which was provided to said wireless device during a configuration of said wireless device.

7. The wireless device of claim 1, wherein said plurality of software objects comprise at least one software component of said computer platform.

8. The wireless device of claim 1, wherein said plurality of software objects comprise at least one device driver of said computer platform.

9. The wireless device of claim 1, wherein said at least one software object comprises a content to be rendered by said computer platform.

10. The wireless device of claim 1, wherein said memory stores a file system, and said plurality of software objects are stored on said file system.

11. The wireless device of claim 1, wherein said memory stores a database, and said plurality of software objects are stored on said database.

12. The wireless device of claim 1, wherein said memory comprises a non-volatile memory.

13. A wireless device comprising:
a wireless communications means, for selectively communicating over a wireless network; and
a computer platform means, coupled to said wireless communications means, for controlling said wireless communications means, and for supporting a plurality of software objects each respectively having a version, said computer platform means comprising:
a memory means, said memory means storing said plurality of software objects; and
a processor means, coupled to said memory means, for controlling said wireless communications means and for supporting said plurality of software objects;
wherein said processor means is configured to:
(a) create in said memory means, a device version summary file, said device version summary file respectively storing the version associated with each of said plurality of software objects stored in said memory means; and
(b) after (a) performing a version update transaction with a server, comprising:
(b)(1) determining whether said server has a server version summary file respectively storing a version associated with each software object stored on said server available for download to said wireless device; and
(b)(2) based on determining that said server has a server version summary file:
transferring said server version summary file to said wireless device;
automatically comparing said device version summary file with said server version summary file to determine which ones of said plurality of software objects stored in said memory are associated with a software object stored on said server having an updated version; and
based on there being at least one software object on said wireless device having an updated version on said server, automatically transferring the updated version of the at least one software object from said server to said wireless device, and installing each transferred and updated software object.

14. A method for updating a plurality of software objects stored in a memory of a computer platform of a wireless device, comprising:
(a) creating, on said wireless device, a device version summary file, said device version summary file respectively storing a version associated with each of said plurality of software objects stored in said memory; and
(b) after said creating, performing a version update transaction with a server,
wherein said version update transaction comprises:
(b)(1) determining whether said server has a server version summary file respectively storing a version associated with each software object stored on said server available for download to said wireless device; and
(b)(2) based on determining that said server has a server version summary file:
transferring said server version summary file to said wireless device;
automatically comparing said device version summary file with said server version summary file to determine which ones of said plurality of software objects stored in said memory are associated with a software object stored on said server having an updated version; and
based on there being at least one software object on said wireless device having an updated version on said server, automatically transferring the updated version of the at least one software object from said server to said wireless device, and installing each transferred and updated software object.

15. The method of claim 14, wherein said plurality of software objects comprise at least one application for execution on said computer platform.

16. The method of claim 15, wherein said at least one application comprises a game.

17. The method of claim 15, wherein said at least one application comprises an application which had been downloaded from said server during a previous user communication session established with said server.

18. The method of claim 15, wherein said at least one application comprises an application which was provided to said wireless device during a manufacture of said wireless device.

19. The wireless device of claim 15, wherein said at least one application comprises an application which was provided to said wireless device during a configuration of said wireless device.

20. The wireless device of claim 14, wherein said plurality of software objects comprise at least one software component of said computer platform.

21. The wireless device of claim 14, wherein said plurality of software objects comprise at least one device driver of said computer platform.

22. The wireless device of claim 14, wherein said at least one software object comprises a content to be rendered by said computer platform.

23. The wireless device of claim 14, wherein said memory stores a file system, and said plurality of software objects are stored on said file system.

24. The wireless device of claim 14, wherein said memory stores a database, and said plurality of software objects are stored on said database.

25. The wireless device of claim 14, wherein said memory comprises a non-volatile memory.

26. A method for updating a plurality of software objects on a wireless device comprising:
   selectively communicating over a wireless network using a wireless communications interface;
   storing said plurality of software objects, each respectively having a version, on a computer platform, said computer platform being coupled to said wireless communications interface, said computer platform configured to control said wireless communications interface;
   creating a device version summary file, said device version summary file respectively storing the version associated with each of said plurality of software objects; and
   after creating said device version summary file, performing a version update transaction with a server,
   wherein said version update transaction comprises:
      (a) determining whether said server has a server version summary file respectively storing a second version associated with each software object stored on said server available for download to said wireless device; and
      (b) based on determining that said server has a server version summary file:
         transferring said server version summary file to said wireless device;
         automatically comparing said device version summary file with said server version summary file to determine which of said plurality of software objects on said wireless device are associated with a software object stored on said server having an updated version; and
         based on there being at least one software object on said wireless device having an updated version on said server, automatically transferring the updated version of the at least one software object from said server to said wireless device, and installing each transferred and updated software object.

27. A server comprising:
   a wireless communications interface, for selectively communicating over a wireless network; and
   a computer platform, coupled to said wireless communications interface, for controlling said wireless communications interface, and for supporting a plurality of software objects each respectively having a version, said computer platform comprising:
      a memory, said memory storing said plurality of software objects; and
      a processor, coupled to said memory, for controlling said wireless communications interface and for supporting said plurality of software objects;
   wherein said processor is configured to:
      (a) create in said memory, a server version summary file, said server version summary file respectively storing the version associated with each of said plurality of software objects stored in said memory available for download to a wireless device; and
      (b) after (a) performing a version update transaction comprising:
         (b)(1) determining whether said wireless device has a device version summary file respectively storing a second version associated with each software object stored on said wireless device; and
         (b)(2) based on determining that said wireless device has a device version summary file:
            transferring said server version summary file to said wireless device;
            wherein said wireless device is configured to automatically compare said device version summary file with said server version summary file to determine which software objects stored on said wireless device are associated with a software object stored in said memory having an updated version; and
            based on there being at least one software object on said wireless device having an updated version on said server, automatically transferring the updated version of said at least one software object from said server to said wireless device, and installing each transferred and updated software object.

28. A server comprising:
   a wireless communications means, for selectively communicating over a wireless network; and
   a computer platform means, coupled to said wireless communications means, for controlling said wireless communications means, and for supporting a plurality of software objects each respectively having a version, said computer platform comprising:
      a memory means, said memory means storing said plurality of software objects; and
      a processor means, coupled to said memory means, for controlling said wireless communications means and for supporting said plurality of software objects;
   wherein said processor means is configured to:
      (a) create, in said memory means, a server version summary file, said server version summary file respectively storing the version associated with each of said software objects stored in said memory means available for download to a wireless device; and
      (b) after (a) performing a version update transaction with said wireless device, said version update transaction comprising:
         (b)(1) determining whether said wireless device has a device version summary file respectively storing a second version associated with each software object stored on said wireless device; and
         (b)(2) based on determining that said wireless device has a device version summary file:
            transferring said server version summary file to said wireless device;
            wherein said wireless device is configured to automatically compare said device version summary file with said server version summary file to determine which software objects stored on said wireless device are associated with a software object stored in said memory means having an updated version; and based on there being at least one software object on said wireless device having an updated version on said server, automatically transferring the updated version of said at least one software object from said server to said wireless device, and installing each transferred and updated software object.

29. A method for a server to transmit an updated version of a plurality of software objects comprising:

selectively communicating with a wireless device over a wireless network;

storing said plurality of software objects each respectively having a version on a computer platform, said computer platform being coupled to a wireless communications interface, said computer platform configured to control said wireless communications interface;

creating a server version summary file, said server version summary file respectively storing said version associated with each of said plurality of software objects available for download to a wireless device; and after creating said server version summary file, performing a version update transaction with said wireless device, wherein said version update transaction comprises:
(a) determining whether said wireless device has at least one device version summary file respectively storing a second version associated with each software object stored on said wireless device available for download to said wireless device; and
(b) based on determining that said wireless device has a device version summary file:
transferring said server version summary file to said wireless device;
wherein said wireless device is configured to automatically compare said device version summary file with said server version summary file to determine which software objects stored on said wireless device are associated with a software object stored on said server having an updated version; and
based on there being at least one software object on said wireless device having an updated version on said server, automatically transferring the updated version of said at least one software object from said server to said wireless device, and installing each transferred and updated software object.

30. A non-transitory computer-readable medium comprising instructions, which, when executed by a computer, cause the computer to perform operations, the instructions comprising:

at least one instruction for selectively communicating with a wireless device over a wireless network;

at least one instruction for storing a plurality of software objects each respectively having a version on a computer platform, said computer platform being coupled to a wireless communications interface, said computer platform configured to control said wireless communications interface;

at least one instruction for creating a server version summary file, said server version summary file respectively storing said version associated with each of said plurality of software objects; and at least one instruction for, after creating said server version summary file, performing a version update transaction with a wireless device, wherein said at least one instruction for performing said version update transaction comprises:
(a) at least one instruction for determining whether said wireless device has at least one device version summary file respectively storing a second version associated with each software object stored on said wireless device available for download to said wireless device; and
(b) at least one instruction for, based on determining that said wireless device has a device version summary file:
transferring said server version summary file to said wireless device;
wherein said wireless device is configured to automatically compare said device version summary file with said server version summary file to determine which software objects stored on said wireless device are associated with a software object stored on said server having an updated version; and
based on there being at least one software object on said wireless device having an updated version on said server, automatically transferring the updated version of said at least one software object from said server to said wireless device, and at least one instruction for installing each transferred and updated software object.

31. The non-transitory computer-readable medium of claim 30, further comprising at least one instruction for defining at least one application, in said plurality of software objects, for execution on said wireless device.

32. The non-transitory computer-readable medium of claim 31, further comprising at least one instruction for defining the at least one application to have been downloaded from said server during a previous user communication session established with said server.

33. The non-transitory computer-readable medium of claim 31, further comprising at least one instruction for providing the at least one application to said wireless device during a manufacture of said wireless device.

34. The non-transitory computer-readable medium of claim 30, further comprising at least one instruction for defining said plurality of software objects to comprise at least one software component of a computer platform on said wireless device.

35. The non-transitory computer-readable medium of claim 30, wherein said plurality of software objects comprise at least one device driver of said wireless device.

36. The non-transitory computer-readable medium of claim 30, further comprising at least one instruction for defining at least one software component to be a content to be rendered by said wireless device.

37. A non-transitory computer-readable medium for updating a plurality of software objects stored in a memory of a computer platform of a wireless device, comprising:

at least one instruction for creating, on said wireless device, a device version summary file, said device version summary file respectively storing a version associated with each of said plurality of software objects stored in said memory; and at least one instruction for, after said creating, performing a version update transaction with a server,
wherein said at least one instruction for performing said version update transaction comprises:
(a) at least one instruction for determining whether said server has a server version summary file respectively storing a version associated with each software object stored on said server available for download to said wireless device; and (b) at least one instruction for, based on determining that the server has a server version summary file:

transferring said server version summary file to said wireless device;

automatically comparing said device version summary file with said server version summary file to determine which ones of said plurality of software objects stored in said memory are associated with a software object stored on said server having an updated version; and based on there being at least one software object on said wireless device having an updated version on said server, automatically transferring the updated version of the at least one software object from said server to said wireless device, and installing each transferred and updated software object.

* * * * *